(12) United States Patent
Kubota et al.

(10) Patent No.: US 9,134,509 B2
(45) Date of Patent: Sep. 15, 2015

(54) IMAGING LENS (71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Tomohiro Yonezawa, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 155 days.

(21) Appl. No.: 13/799,271

(22) Filed: Mar. 13, 2013

(65) Prior Publication Data
US 2013/0279024 A1    Oct. 24, 2013

(30) Foreign Application Priority Data

Apr. 19, 2012   (JP) .................................. 2012-095204

(51) Int. Cl.
| | | |
|---|---|---|
| G02B 13/18 | (2006.01) | |
| G02B 3/02 | (2006.01) | |
| G02B 9/34 | (2006.01) | |
| G02B 13/00 | (2006.01) | |

(52) U.S. Cl.
CPC ................ *G02B 13/004* (2013.01); *G02B 9/34* (2013.01); *G02B 13/18* (2013.01)

(58) Field of Classification Search
CPC ......... G02B 9/34; G02B 13/004; G02B 13/18
USPC .......................................... 359/715, 771, 781
See application file for complete search history.

(56) References Cited

U.S. PATENT DOCUMENTS

| | | | | |
|---|---|---|---|---|
| 6,088,172 A * | 7/2000 | Sato | ............................... | 359/770 |
| 7,009,784 B2 * | 3/2006 | Amanai | ........................ | 359/779 |
| 7,095,570 B2 * | 8/2006 | Amanai | ........................ | 359/781 |
| 7,110,188 B2 * | 9/2006 | Matsui et al. | .................. | 359/714 |
| 7,190,532 B2 * | 3/2007 | Amanai | ........................ | 359/781 |
| 7,636,205 B2 * | 12/2009 | Yamamoto | .................... | 359/781 |
| 7,660,049 B2 * | 2/2010 | Tang | ............................ | 359/781 |
| 7,848,032 B1 * | 12/2010 | Chen et al. | .................... | 359/715 |
| 8,189,272 B1 * | 5/2012 | Huang et al. | .................. | 359/715 |
| 8,351,135 B2 * | 1/2013 | Mori | ............................. | 359/771 |
| 2011/0080655 A1* | 4/2011 | Mori | ............................. | 359/715 |
| 2013/0107378 A1* | 5/2013 | Kubota et al. | ................. | 359/753 |
| 2014/0029117 A1* | 1/2014 | Noda | ........................... | 359/714 |

FOREIGN PATENT DOCUMENTS

| | | |
|---|---|---|
| JP | 2004-361934 A | 12/2004 |
| JP | 2005-31638 A | 2/2005 |
| WO | WO 2012132456 A1 * | 10/2012 |

* cited by examiner

*Primary Examiner* — Thomas K Pham
*Assistant Examiner* — Nicholas Pasko
(74) *Attorney, Agent, or Firm* — Kubotera & Associates, LLC (57) ABSTRACT

An imaging lens includes a first lens having negative refractive power; a stop; a second lens having positive refractive power; a third lens having negative refractive power; and a fourth lens having positive refractive power, arranged in the order from an object side to an image plane side. The first lens has an object-side surface and an image plane-side surface, curvature radii of which are both negative. The second lens has an object-side surface and an image plane-side surface, curvature radii of which are both positive. The third lens has an object-side surface and an image plane-side surface, curvature radii of which are both negative. The fourth lens has an object-side surface, a curvature of which is positive.

24 Claims, 9 Drawing Sheets

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera equipped in a cellular phone and a portable information terminal, a digital still camera, a security camera, a vehicle onboard camera, and a network camera.

In these years, in place of cellular phones that are intended mainly for making phone calls, so-called smart phones have been more widely used. The smart phones are cellular phones with functions of portable information terminals (PDA) and/or personal computers. Since the smart phones generally have more functions than those of the cellular phones, it is possible to use images taken by a camera thereof in various applications. For example, while it is possible to use the smart phones for printing and enjoying images taken, it is also possible to use images in other usage such as processing images to use for game characters or for makeup simulations, dress fitting simulations, and the others. The ways of the image usage were not conventionally common, however, it becomes more common mainly among young people.

In case of the smart phones, products are often available with various specifications ranging from the ones for beginners to the ones for advanced users. Generally, for an imaging lens for mounting in a cellular phone or a smart phone, which is developed for advanced users, it is required to have a high resolution lens configuration so as to be also applicable to a high pixel count imaging element of these days. On the other hand, in case of an imaging lens mounting on a smart phone for the above-described usage, it is rather important to be a smaller size and a wider angle of view, namely a wide angle, than to be a high resolution. Especially in these days, there are demands for an imaging lens to be a smaller size and a wider angle than conventional ones, associating with the fact that the smart phones become smaller and have more functions.

A lens configuration composed of four lenses is considered to be as one of the most suitable lens configurations in order to solve the above-described problems. As for an imaging lens configuration composed of four lenses, Patent Reference 1 and Patent Reference 2 have been known. The imaging lenses described in Patent References include a first lens that is negative and is a meniscus lens directing a concave surface thereof to the object side; a second lens that is a biconvex lens; a third lens that is negative and is a meniscus lens directing a concave surface thereof to the object side; and a fourth lens that is positive.

According to the configuration described above, the first lens is formed as a meniscus lens directing a concave surface thereof to the object side, thereby making it possible to achieve the wider angle of the imaging lens. In addition, the third lens is formed as a meniscus lens directing a concave surface thereof to the object side, so that it is possible to keep an angle between an incident light beam and an emitting light beam (angle of deviation) small and to restrain generation of aberrations on each reflecting surface.

Patent Reference 1: Japanese Patent Application Publication No. 2004-361934

Patent Reference 2: Japanese Patent Application Publication No. 2005-31638

According to the imaging lenses described in Patent Reference 1 and Patent Reference 2, it is possible to reduce a size of the imaging lens while securing the relatively wide angle of view. However, attaining more functions and the size reduction have been proceeding each year, and consequently, demand level for even wider angle and smaller size for the imaging lenses are higher than before. With the lens configuration described in Patent Reference 1 or Patent Reference 2, there is a limit by itself for attaining both the wide angle and the small size to satisfy the demands.

Further, the problem is not specific only to the imaging lens for mounting in small-sized portable devices such as cellular phones and smart phones, but also it is a problem for an imaging lens for mounting in a relatively small camera such as digital still cameras, portable information terminals, security cameras, vehicle onboard cameras, and network cameras.

In view of solving the above-described problems in the conventional techniques, an object of the present invention is to provide an imaging lens that can attain the wider angle and the size reduction.

Further objects and advantages of the invention will be apparent from the following description of the invention.

SUMMARY OF THE INVENTION

In order to attain the objects described above, according a first aspect of the present invention, an imaging lens includes a first lens having negative refractive power; a stop; a second lens having positive refractive power; a third lens having negative refractive power; and a fourth lens having positive refractive power, arranged in the order from an object side to an image plane side. The first lens has an object-side surface and an image plane-side surface, curvature radii of which are both negative. The second lens has an object-side surface and an image plane-side surface, curvature radii of which are both positive. The third lens has an object-side surface and an image plane-side surface, curvature radii of which are both negative. The fourth lens has an object-side surface, a curvature of which is positive.

In is noted that in an attempt to attain a wider angle of the imaging lens, it is effective to provide the first lens with the negative refractive power, and to form the first lens in a shape such that the curvature radii of the object-side surface thereof and the image plane-side surface thereof are both negative, that is namely a shape of a meniscus lens directing a concave surface thereof to the object side near an optical axis. However, in case of a lens configuration in which the first lens is formed in a shape so as to have negative refractive power, and is disposed most closely to the object side, a distance from an image plane to an exit pupil tends to become long. When the distance from the image plane to the exit pupil becomes long, it creates difficulty in attaining the downsizing of the imaging lens.

In general, a position of an exit pupil in an imaging lens is determined depending on rather by its refractive power and lens shapes of each lens, which are arranged closer to the image plane side than by the stop. Among the lenses, it is largely influenced by refractive power and the lens shape of the second lens, which is disposed most closely to the stop. For this reason, according to the first aspect of the invention of the imaging lens, the second lens has positive refractive power and the curvature radii of the object-side surface thereof and the image plane-side surface thereof are both positive, that is namely, a shape of a meniscus lens directing a convex surface thereof to the object side near the optical axis for restraining to become long the distance from the image plane to the exit pupil. Accordingly, according to the first aspect of the invention, the imaging lens has the lens configuration suitably attainable both the wide angle and the downsizing of the imaging lens.

According to a second aspect of the present invention, when the curvature radius of the object-side surface of the first lens is R1$f$ and the curvature radius of the image plane-side surface of the first lens is R1$r$, the imaging lens having the above-described configuration preferably satisfies the following conditional expression (1):

$$0.5<R1f/R1r<0.95 \qquad (1)$$

When the imaging lens satisfies the conditional expression (1), it is achievable to restrain a field curvature within a satisfactory range, while attaining downsizing and the wide angle of the imaging lens. When the value exceeds the upper limit of "0.95", the negative refractive power of the first lens is relatively weak. For this reason, although it is advantageous for downsizing of the imaging lens and correction of a chromatic aberration of magnification, it creates difficulty in attaining the wide angle of the imaging lens. On the other hand, when the value is below the lower limit of "0.5", since the first lens has relatively strong refractive power, it is an effective configuration to attain the wide angle of the imaging lens. However, an off-axis chromatic aberration of magnification is insufficiently corrected (an image-forming point at a short wavelength moves close to the optical axis in relative to an image-forming point at a reference wavelength) and periphery of an image surface curves to the image plane side (in a positive direction), so that it creates difficulty in obtaining satisfactory image-forming performance. In addition, a back focal length (back focus) increases, so that it creates difficulty in attaining the downsizing of the imaging lens.

According to a third aspect of the present invention, when the first lens has a focal length f1 and the second lens has a focal length f2, the imaging lens having the above-described configuration preferably satisfies the following conditional expression (2):

$$-8.0<f1/f2<-4.0 \qquad (2)$$

According to the third aspect of the present invention, the imaging lens of the invention has the lens configuration, in which a chromatic aberration is corrected by the first lens having negative refractive power and the second lens having positive refractive power. When the imaging lens satisfies the conditional expression (2), it is achievable to restrain a chromatic aberration within a satisfactory range and restrain field curvature. In addition, when the imaging lens satisfies the conditional expression (2), it is also enables to restrain an incident angle of a light beam emitted from the imaging lens to the imaging element within a certain range.

When the value exceeds the upper limit of "−4.0", since the second lens has weak refractive power in relative to the first lens, a position of an exit pupil moves to the object side. Accordingly, it facilitates to restrain the incident angle of a light beam emitted from the imaging lens to the imaging element within a certain range. However, since a sagittal image surface of the astigmatism tilts towards the image plane, periphery of the image surface curves to the image plane side and it creates difficulty in obtaining satisfactory image-forming performance. On the other hand, when the value is below the lower limit of "−8.0", since the second lens has strong refractive power in relative to the first lens, although it is advantageous for downsizing of the imaging lens, the axial chromatic aberration is insufficiently corrected (a focal point at a short wavelength moves to the object side in relative to a focal position at a reference wavelength). In addition, since periphery of the image surface curves to the object side (negative direction), it is difficult to obtain satisfactory image-forming performance.

According to a fourth aspect of the present invention, when the curvature radius of the object-side surface of the second lens is R2$f$ and the curvature radius of the image plane-side of the second lens is R2$r$, the imaging lens having the above-described configuration preferably satisfies the following conditional expression (3):

$$0.05<R2f/R2r<0.15 \qquad (3)$$

When the imaging lens satisfies the conditional expression (3), it enables to restrain an astigmatism and a coma aberration within satisfactory ranges. When the value exceeds the upper limit of "0.15", since an inner coma aberration is easily generated on a tangential surface of an off-axis light beam and an astigmatic difference increases, it creates difficulty in obtaining satisfactory image-forming performance. On the other hand, when the value is below the lower limit of "0.05", an outer coma aberration is easily generated. Therefore, also in this case, it creates difficulty in obtaining satisfactory image-forming performance.

According to a fifth aspect of the present invention, when a composite focal length of the first lens and the second lens is f12 and a composite focal length of the third lens and the fourth lens is f34, the imaging lens having the above-described configuration preferably satisfies the following conditional expression (4):

$$0.05<f12/f34<0.20 \qquad (4)$$

When the imaging lens satisfies the conditional expression (4), it is achievable to restrain a chromatic aberration within a satisfactory range while attaining downsizing of the imaging lens. In addition, when the imaging lens satisfies the conditional expression (4), it is also achievable to restrain an incident angle of a light beam emitted from the imaging lens to the imaging element within a certain range. When the value exceeds the upper limit of "0.20", composite refractive power of the first lens and the second lens is weak in relative to the third lens and the fourth lens, and although it facilitates to restrain the incident angle of a light beam emitted from the imaging lens to the imaging element within a certain range, it creates difficulty in attaining the downsizing. Here, in order to attain downsizing in the configuration like this, the fourth lens usually has strong positive refractive power, so that a chromatic aberration of magnification is insufficiently corrected and it creates difficulty in obtaining satisfactory image-forming performance. When the value is below the lower limit of "0.05", composite refractive power of the third lens and the fourth lens is weak in relative to the first lens and the second lens, and although it is advantageous for downsizing of the imaging lens and correction of a chromatic aberration of magnification, it creates difficulty in restraining the incident angle of a light beam emitted from the imaging lens to the imaging element within a certain range.

According to a sixth aspect of the present invention, when the whole lens system has a focal length f and a composite focal length of the second lens and the third lens is f23, the imaging lens having the above-described configuration preferably satisfies the following conditional expression (5):

$$1.5<f23/f<2.5 \qquad (5)$$

When the imaging lens satisfies the conditional expression (5), it is achievable to restrain aberrations such as a chromatic aberration, an astigmatism, and a coma aberration within satisfactory ranges. When the value exceeds the upper limit of "2.5", since the negative refractive power of the third lens is strong in relative to the positive refractive power of the second lens, it results the astigmatic difference and the coma aberration increase, and it creates difficulty in obtaining satisfactory image-forming performance. On the other hand, when the value is below the lower limit of "1.5", since the negative refractive power of the third lens is relatively weak, although it is advantageous for downsizing of the imaging lens, an axial chromatic aberration and an off-axis chromatic aberration of magnification are both insufficiently corrected, and it creates difficulty in obtaining satisfactory image-forming performance.

According to a seventh aspect of the present invention, when the first lens has an Abbe's number vd1, the second lens has an Abbe's number vd2, the third lens has an Abbe's number vd3, and the fourth lens has an Abbe's number vd4, the imaging lens having the above-described configuration preferably satisfies the following conditional expressions (6) and (7). When the imaging lens satisfies the conditional expressions (6) and (7), it is achievable to satisfactorily correct a chromatic aberration.

$$45<vd1,vd2,vd4<75 \quad (6)$$

$$20<vd3<40 \quad (7)$$

According to the imaging lens of the invention, it is achievable to suitably attain both downsizing and the wide angle of the imaging lens.

DETAILED DESCRIPTION OF PREFERRED EMBODIMENTS

Hereunder, referring to the accompanying drawings, an embodiment of the present invention will be fully described.

Figure 1:
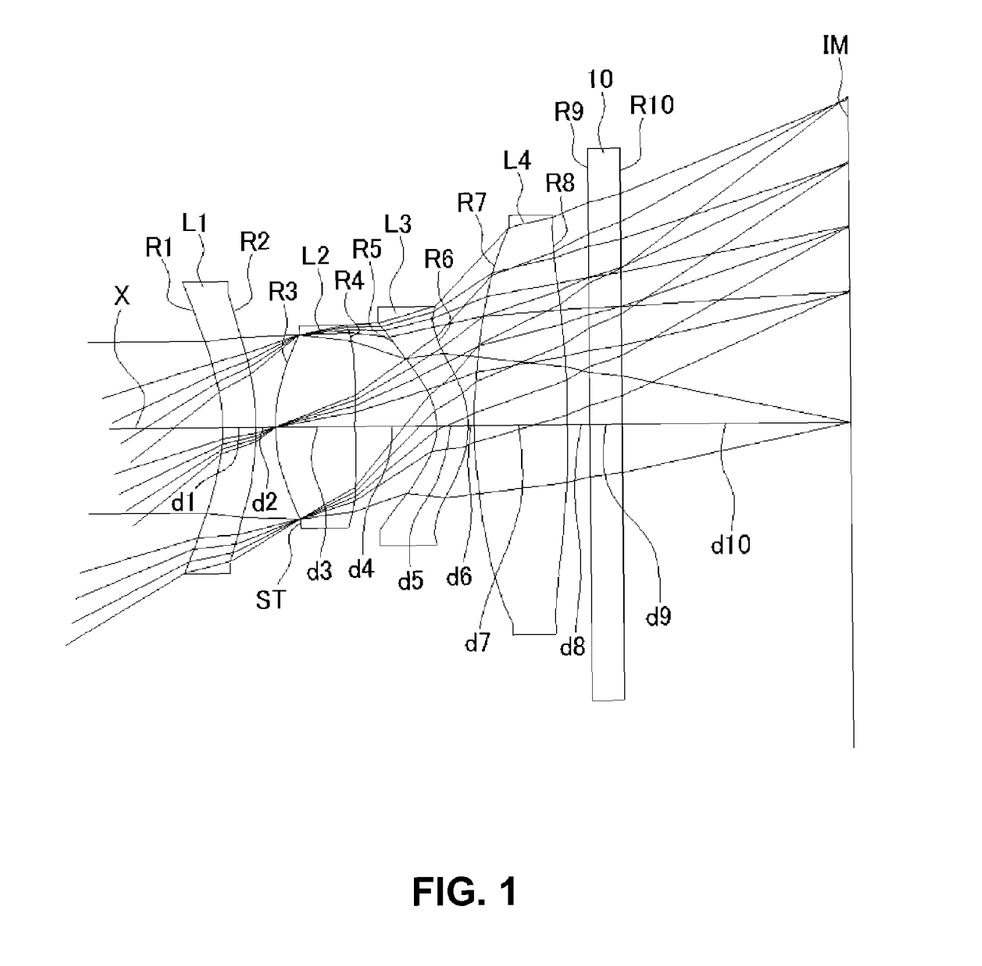
FIG. 1 shows a sectional view of a schematic configuration of an imaging lens in Numerical Data Example 1 according to an embodiment of the invention.
Figure 4:
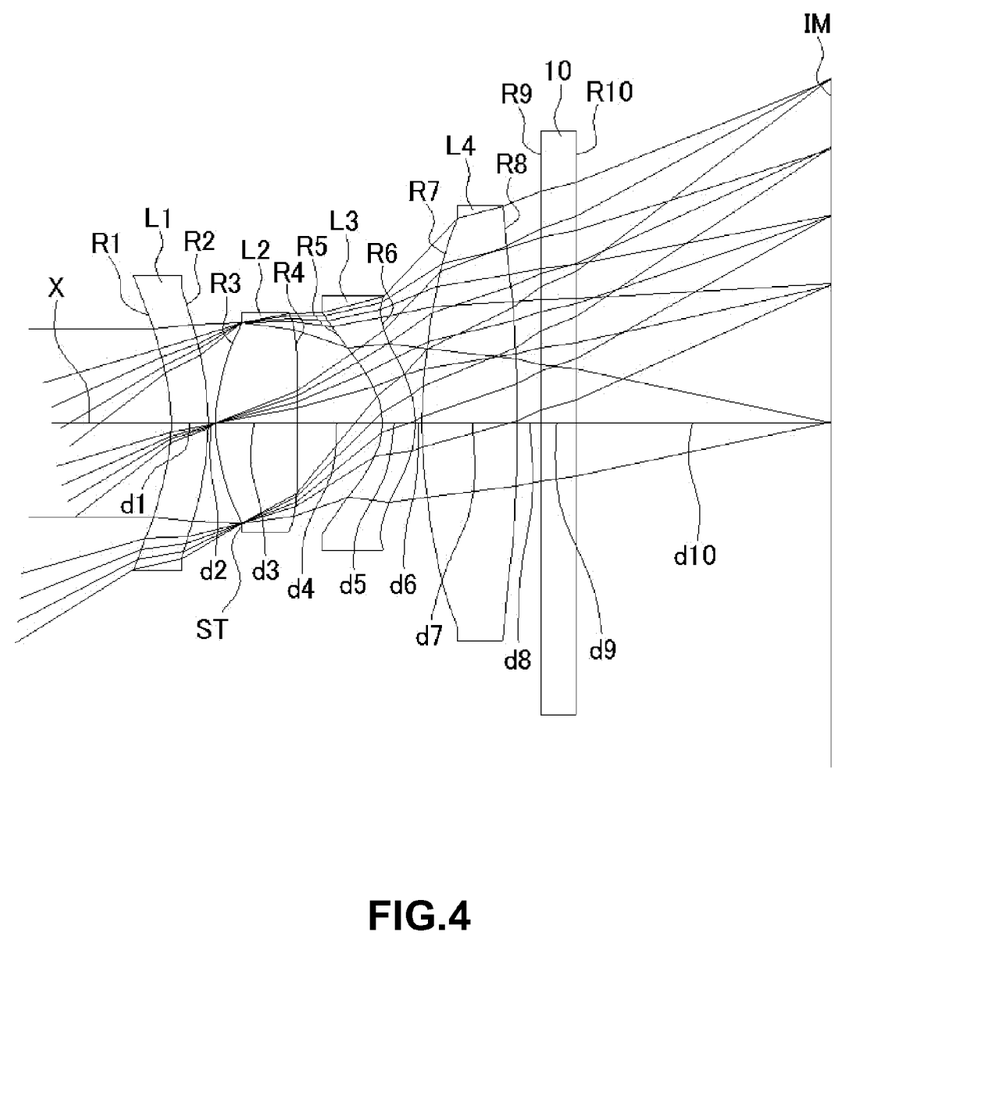
FIG. 4 shows a sectional view of a schematic configuration of an imaging lens in Numerical Data Example 2 according to the embodiment of the invention.
Figure 7:
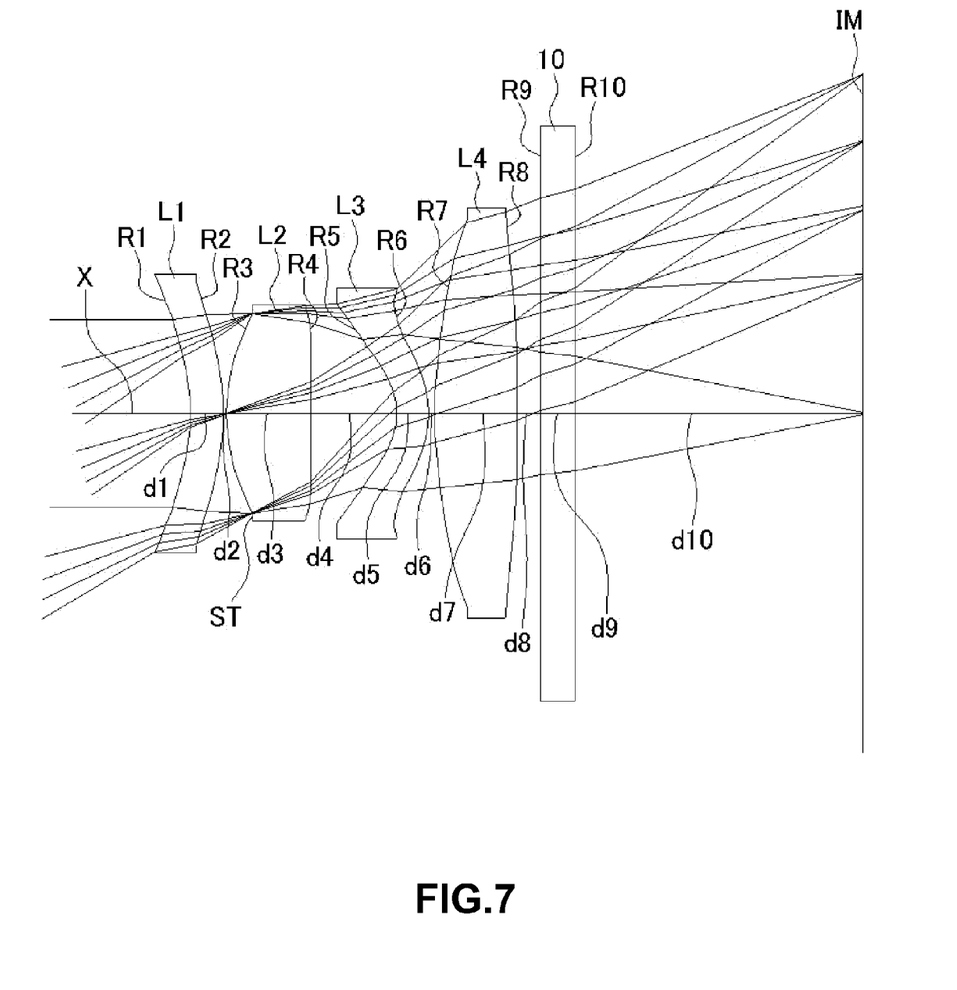
FIG. 7 shows a sectional view of a schematic configuration of an imaging lens in Numerical Data Example 3 according to the embodiment of the invention.

FIGS. 1, 4, and 7 are schematic sectional views of imaging lenses in Numerical Data Examples 1 to 3 according to the embodiment, respectively. Since a basic lens configuration is the same among those Numerical Data Examples, the lens configuration of the embodiment will be described with reference to the schematic sectional view of Numerical Data Example 1.

As shown in FIG. 1, the imaging lens of the embodiment includes a first lens L1 having negative refractive power, a second lens L2 having positive refractive power, a third lens L3 having negative refractive power, and a fourth lens L4 having positive refractive power, arranged in the order from an object side to an image plane side. A filter 10 may be provided between the fourth lens L4 and an image plane IM. The filter 10 may be optionally omitted. In the imaging lens of the embodiment, there is provided a stop ST on an object-side surface of the second lens L2.

According to the imaging lens having the above-described configuration, the first lens L1 is formed in a shape such that a curvature radius R1 of an object-side surface thereof and a curvature radius R2 of an image plane-side surface thereof are both negative and has a shape of a meniscus lens directing a concave surface thereof to the object side near an optical axis X. The second lens L2 is formed in a shape such that a curvature radius R3 of an object-side surface thereof and a curvature radius R4 of an image plane-side surface thereof are both positive and has a shape of a meniscus lens directing a convex surface thereof to the object side near the optical axis X.

The third lens L3 is formed in a shape such that a curvature radius R5 of an object-side surface thereof and a curvature radius R6 of an image plane-side surface thereof are both negative and has a shape of a meniscus lens directing a concave surface thereof to the object side near the optical axis X. The fourth lens L4 is formed in a shape such that a curvature radius R7 of an object-side surface thereof is positive and a curvature radius R8 of an image plane-side surface thereof is negative and has a shape of a biconvex lens near the optical axis X. Here, the shape of the fourth lens L4 is not limited to the one of this embodiment, and can be any as long as the curvature radius R7 of the object-side surface thereof is positive, and can be a shape in which the curvature radius R7 and the curvature radius R8 are both positive, i.e., a shape of a meniscus lens directing a convex surface thereof to the object side near the optical axis X.

The imaging lens of this embodiment satisfies the following conditional expressions (1) through (7):

$$0.5<R1f/R1r<0.95 \quad (1)$$

$$-8.0<f1/f2<-4.0 \quad (2)$$

$$0.05<R2f/R2r<0.15 \quad (3)$$

$$0.05<f12/f34<0.20 \quad (4)$$

$$1.5<f23/f<2.5 \quad (5)$$

$$45<vd1,vd2,vd4<75 \quad (6)$$

$$20<vd3<40 \quad (7)$$

In the above conditional expressions,
f: Focal length of the whole lens system
f1: Focal length of the first lens L1
f2: Focal length of the second lens L2
f12: Composite focal length of the first lens L1 and the second lens L2
f23: Composite focal length of the second lens L2 and the third lens L3
f34: Composite focal length of the third lens L3 and the fourth lens L4
R1f: Curvature radius of an object-side surface of the first lens L1
R1r: Curvature radius of the image plane-side surface of the first lens L1
R2f: Curvature radius of the object-side surface of the second lens L2

R2r: Curvature radius of the image plane-side surface of the second lens L2
vd1: Abbe's number of the first lens L1 for a d line
vd2: Abbe's number of the second lens L2 for a d line
vd3: Abbe's number of the third lens L3 for a d line
vd4: Abbe's number of the fourth lens L4 for a d line Here, it is not necessary to satisfy all of the conditional expressions, and it is achievable to obtain an effect corresponding to the respective conditional expression when any single one of the conditional expressions is individually satisfied.

In the embodiment, any lens surfaces are formed as an aspheric surface. When the aspheric surfaces applied to the lens surfaces have an axis Z in a direction of the optical axis, a height H in a direction perpendicular to the optical axis, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces may be expressed as follows:

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line (a reference wavelength), and vd represents Abbe's number for the d line, respectively. Here, aspheric surfaces are indicated with surface numbers i affixed with * (asterisk).

Numerical Data Example 1

Basic data are shown below.

f = 3.73 mm, Fno = 2.4, ω = 38.3°
Unit: mm

Surface Data

| Surface Number i | R | d | Nd | vd |
|---|---|---|---|---|
| (Object) | ∞ | ∞ | | |
| 1* | −1.686(=R1f) | 0.301 | 1.5351 | 56.1(=vd1) |
| 2* | −2.329(=R1r) | 0.179 | | |
| 3* (Stop) | 1.511(=R2f) | 0.717 | 1.5351 | 56.1(=vd2) |
| 4* | 24.149(=R2r) | 0.742 | | |
| 5* | −0.589 | 0.283 | 1.6142 | 26.0(=vd3) |
| 6* | −0.875 | 0.050 | | |
| 7* | 2.881 | 0.848 | 1.5351 | 56.1(=vd4) |
| 8* | −16.035 | 0.200 | | |
| 9 | ∞ | 0.300 | 1.5163 | 64.1 |
| 10 | ∞ | 2.064 | | |
| (Image plane) | ∞ | | | | f1 = −13.64 mm
f2 = 2.98 mm
f3 = −4.70 mm
f4 = 2.46 mm
f12 = 3.49 mm
f23 = 5.89 mm
f34 = 20.52 mm

-continued f = 3.73 mm, Fno = 2.4, ω = 38.3°
Unit: mm

Aspheric Surface Data

First Surface
k = −5.824, $A_4$ = −1.247E−02, $A_6$ = 1.490E−03,
$A_8$ = 2.796E−03, $A_{10}$ = −4.135E−04
Second Surface
k = 0.000, $A_4$ = 5.469E−02, $A_6$ = −1.445E−02,
$A_8$ = 7.287E−03, $A_{10}$ = −3.925E−04
Third Surface
k = −3.275, $A_4$ = 4.305E−02, $A_6$ = 6.732E−03,
$A_8$ = −4.926E−03, $A_{10}$ = −3.314E−02
Fourth Surface
k = 0.000, $A_4$ = −6.739E−02, $A_6$ = −7.396E−02,
$A_8$ = 7.107E−02, $A_{10}$ = −6.476E−02
Fifth Surface
k = −2.377, $A_4$ = −5.025E−01, $A_6$ = 6.576E−01,
$A_8$ = 6.524E−01, $A_{10}$ = −1.587, $A_{12}$ = 4.704E−01,
$A_{14}$ = 6.153E−01, $A_{16}$ = −3.462E−01
Sixth Surface
k = −7.686E−01, $A_4$ = 6.618E−02, $A_6$ = 2.930E−01,
$A_8$ = 1.672E−01, $A_{10}$ = −3.392E−01, $A_{12}$ = 1.112E−01,
$A_{14}$ = 3.170E−02, $A_{16}$ = −1.767E−02
Seventh Surface
k = −7.504E+01, $A_4$ = 1.343E−02, $A_6$ = 6.944E−03,
$A_8$ = −6.147E−03, $A_{10}$ = 1.824E−03, $A_{12}$ = 7.246E−05,
$A_{14}$ = −1.192E−04, $A_{16}$ = 1.466E−05
Eighth Surface
k = 0.000, $A_4$ = −3.417E−02, $A_6$ = 2.525E−02,
$A_8$ = −8.310E−03, $A_{10}$ = 7.811E−04, $A_{12}$ = 2.376E−04,
$A_{14}$ = −4.056E−05, $A_{16}$ = −4.818E−07
$A_8$ = −8.310E−03, $A_{10}$ = 7.811E−04, $A_{12}$ = 2.376E−04,
$A_{14}$ = −4.056E−05, $A_{16}$ = −4.818E−07

The values of the respective conditional expressions are as follows:

R1f/R1r=0.72 f1/f2=−4.58

R2f/R2r=0.063 f12/f34=0.17 f23/f=1.58

Accordingly, the imaging lens of Numerical Data Example 1 satisfies the above-described conditional expressions. A distance on the optical axis X from the object-side surface of the first lens L1 to the image plane IM (length in air) is 5.58 mm, and downsizing of the imaging lens is attained.

Figure 2:
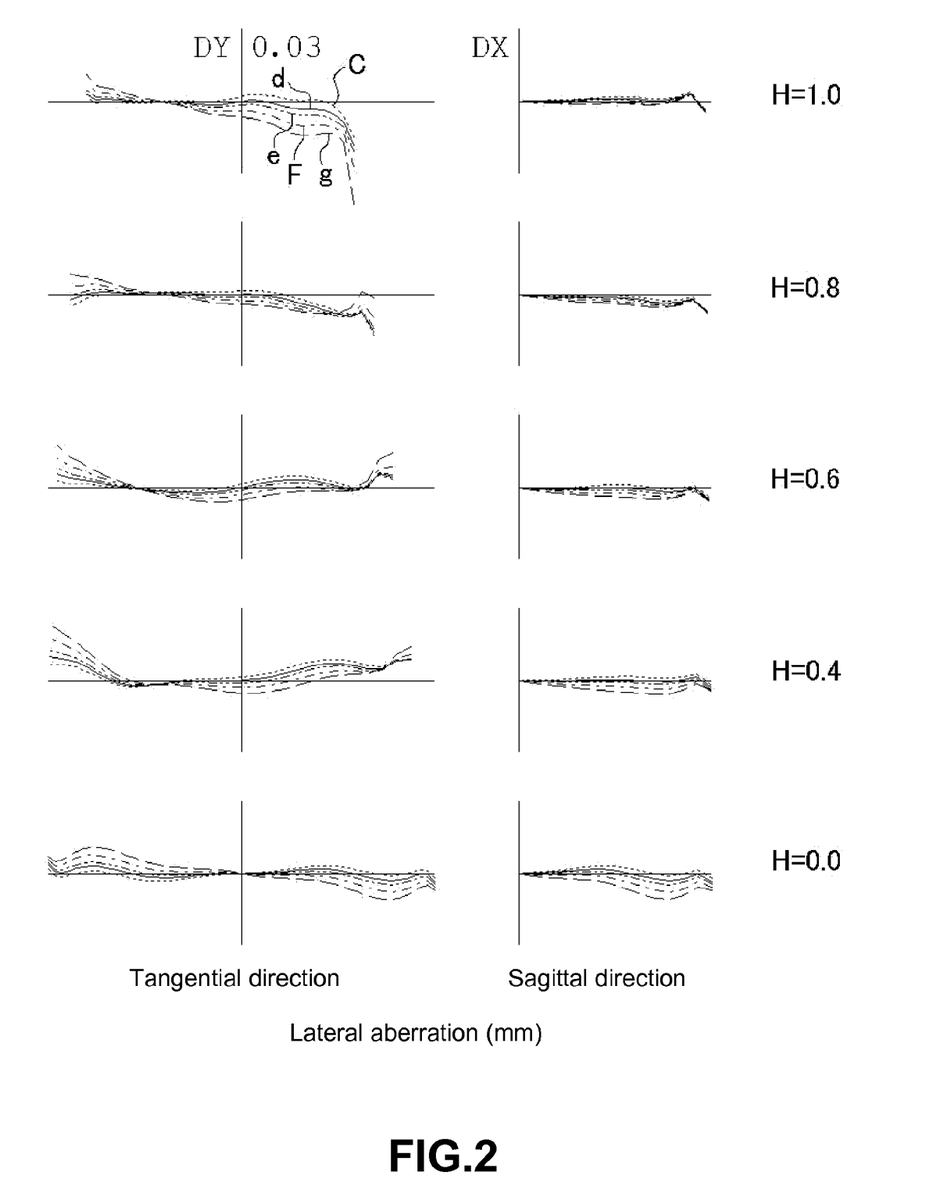
FIG. 2 is an aberration diagram showing a lateral aberration of the imaging lens of FIG. 1.
Figure 3:
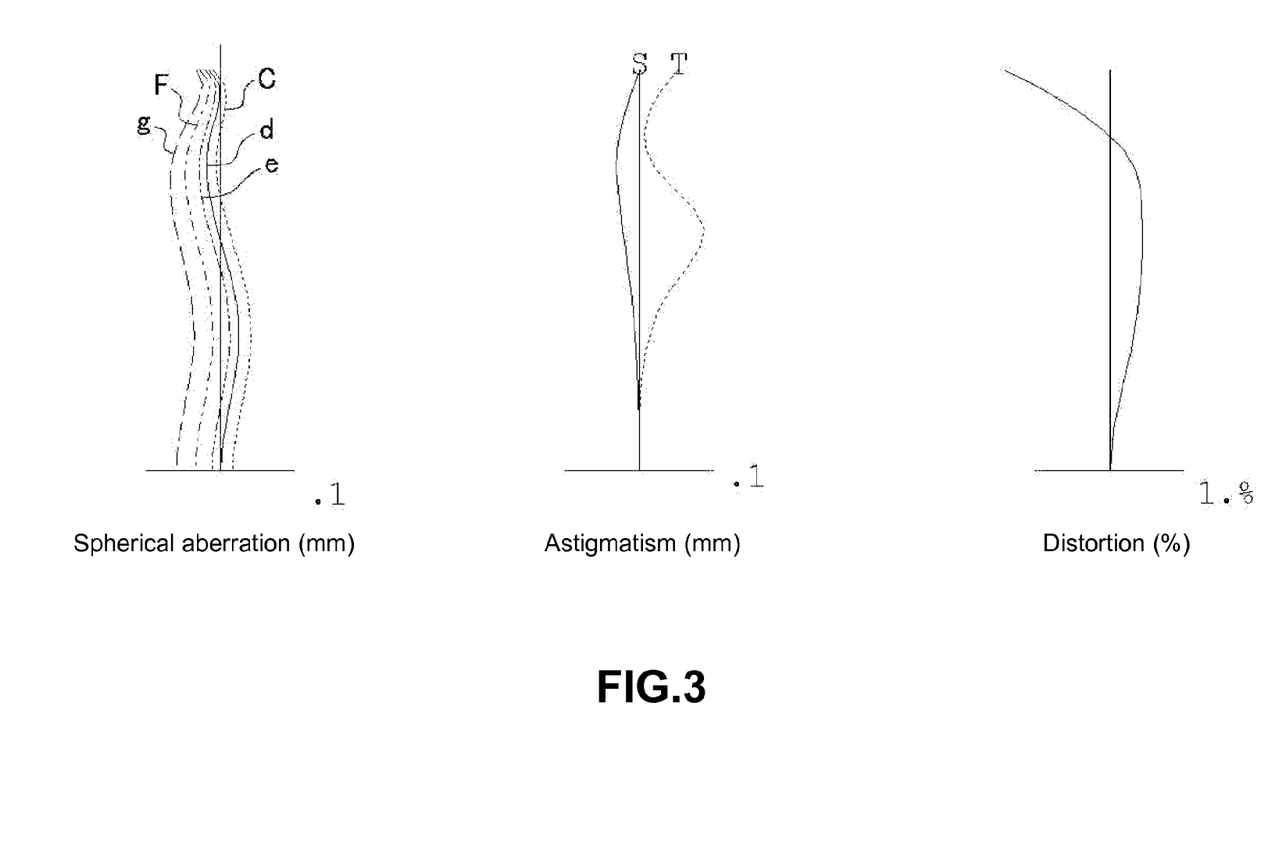
FIG. 3 is an aberration diagram showing a spherical aberration, an astigmatism, and a distortion of the imaging lens of FIG. 1.

FIG. 2 shows a lateral aberration of the imaging lens of Numerical Data Example 1, which corresponds to a ratio H of each image height to the maximum image height (hereinafter referred to as "image height ratio H"), which is divided into a tangential direction and a sagittal direction (which is the same in FIGS. 5 and 8). Furthermore, FIG. 3 shows a spherical aberration (mm), an astigmatism (mm), and a distortion (%), respectively. In the aberration diagrams, for the lateral aberration diagrams and spherical aberration diagrams, aberrations at each wavelength, i.e. a g line (435.84 nm), an F line (486.13 nm), an e line (546.07 nm), a d line (587.56 nm), and a C line (656.27 nm) are indicated. In the astigmatism diagram, an aberration on a sagittal image surface S and an aberration on a tangential image surface T are respectively indicated (which are the same in FIGS. 6 and 9). As shown in FIGS. 2 and 3, according to the imaging lens of Numerical Data Example 1, the aberrations are satisfactorily corrected.

Numerical Data Example 2

Basic data are shown below.

f = 3.87 mm, Fno = 2.4, ω = 37.3°
Unit: mm

Surface Data

| Surface Number i | R | d | Nd | vd |
|---|---|---|---|---|
| (Object) | ∞ | ∞ | | |
| 1* | −1.769(=R1f) | 0.314 | 1.5351 | 56.1(=vd1) |
| 2* | −2.311(=R1r) | 0.065 | | |
| 3* (Stop) | 1.559(=R2f) | 0.692 | 1.5351 | 56.1(=vd2) |
| 4* | 18.405(=R2r) | 0.733 | | |
| 5* | −0.595 | 0.283 | 1.6142 | 26.0(=vd3) |
| 6* | −0.889 | 0.050 | | |
| 7* | 2.832 | 0.820 | 1.5351 | 56.1(=vd4) |
| 8* | −22.910 | 0.200 | | |
| 9 | ∞ | 0.300 | 1.5163 | 64.1 |
| 10 (Image plane) | ∞ | 2.179 | | | f1 = −17.67 mm
f2 = 3.14 mm
f3 = −4.62 mm
f4 = 4.76 mm
f12 = 3.54 mm
f23 = 6.77 mm
f34 = 27.33 mm

Aspheric Surface Data

First Surface $k = -6.102, A_4 = -1.396E-02, A_6 = 1.004E-03,$
$A_8 = 2.828E-03, A_{10} = -3.520E-04$
Second Surface $k = 0.000, A_4 = 5.590E-02, A_6 = -1.477E-02,$
$A_8 = 7.120E-03, A_{10} = -2.292E-04$
Third Surface $k = -3.306, A_4 = 4.392E-02, A_6 = 8.458E-03,$
$A_8 = -3.497E-03, A_{10} = -3.472E-02$
Fourth Surface $k = 0.000, A_4 = -6.996E-02, A_6 = -7.308E-02,$
$A_8 = 7.469E-02, A_{10} = -6.488E-02$
Fifth Surface $k = -2.444, A_4 = -5.005E-01, A_6 = 6.610E-01,$
$A_8 = 6.555E-01, A_{10} = -1.611, A_{12} = 4.936E-01,$
$A_{14} = 6.199E-01, A_{16} = -3.533E-01$
Sixth Surface $k = -7.680E-01, A_4 = 6.611E-02, A_6 = 2.925E-01,$
$A_8 = 1.666E-01, A_{10} = -3.390E-01, A_{12} = 1.110E-01,$
$A_{14} = 3.197E-02, A_{16} = -1.779E-02$
Seventh Surface $k = -7.194E+01, A_4 = 1.354E-02, A_6 = 6.745E-03,$
$A_8 = -6.162E-03, A_{10} = 1.824E-03, A_{12} = 7.195E-05,$
$A_{14} = -1.196E-04, A_{16} = 1.448E-05$
Eighth Surface $k = 0.000, A_4 = -3.515E-02, A_6 = 2.490E-02,$
$A_8 = -8.332E-03, A_{10} = 7.898E-04, A_{12} = 2.375E-04,$
$A_{14} = -4.146E-05, A_{16} = -6.818E-07$ The values of the respective conditional expressions are as follows:

$R1f/R1r=0.77$ $f1/f2=-5.63$ $R2f/R2r=0.085$ $f12/f34=0.13$ $f23/f=1.75$

Accordingly, the imaging lens of Numerical Data Example 2 satisfies the above-described conditional expressions. A distance on the optical axis X from the object-side surface of the first lens L1 to the image plane IM (length in air) is 5.53 mm, and downsizing of the imaging lens is attained.

Figure 5:
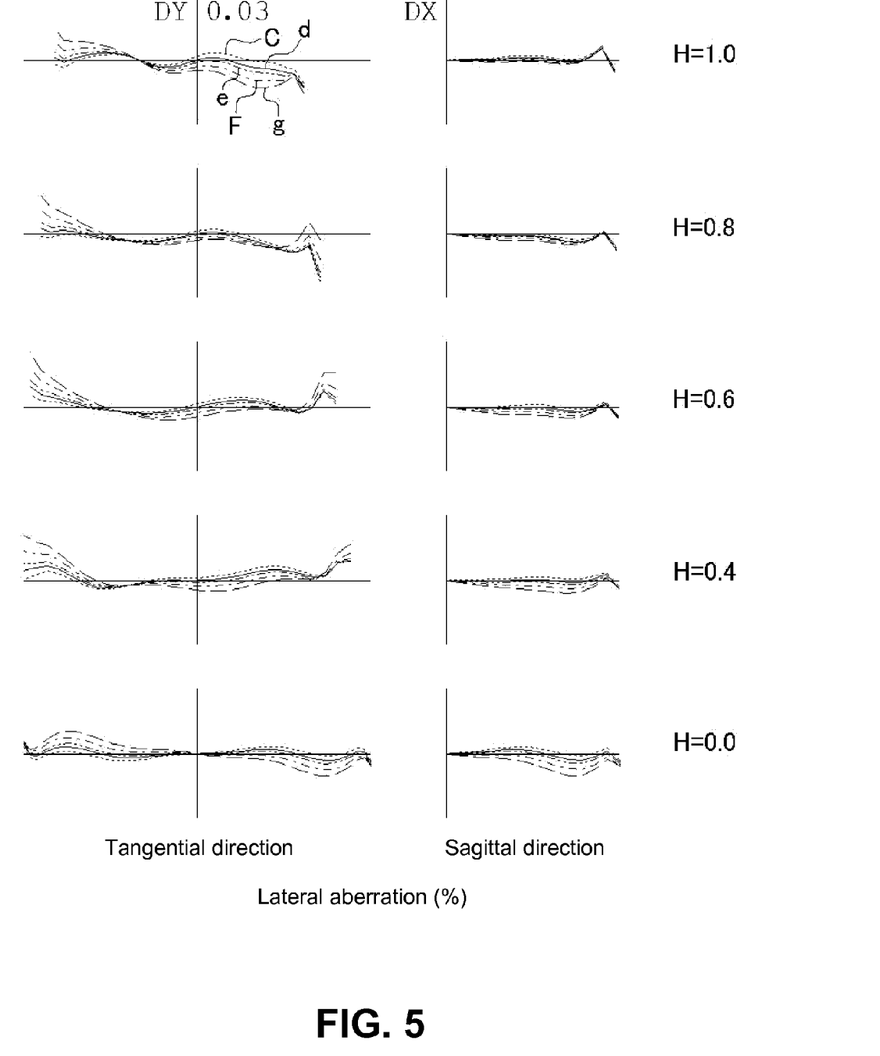
FIG. 5 is an aberration diagram showing a lateral aberration of the imaging lens of FIG. 4.
Figure 6:
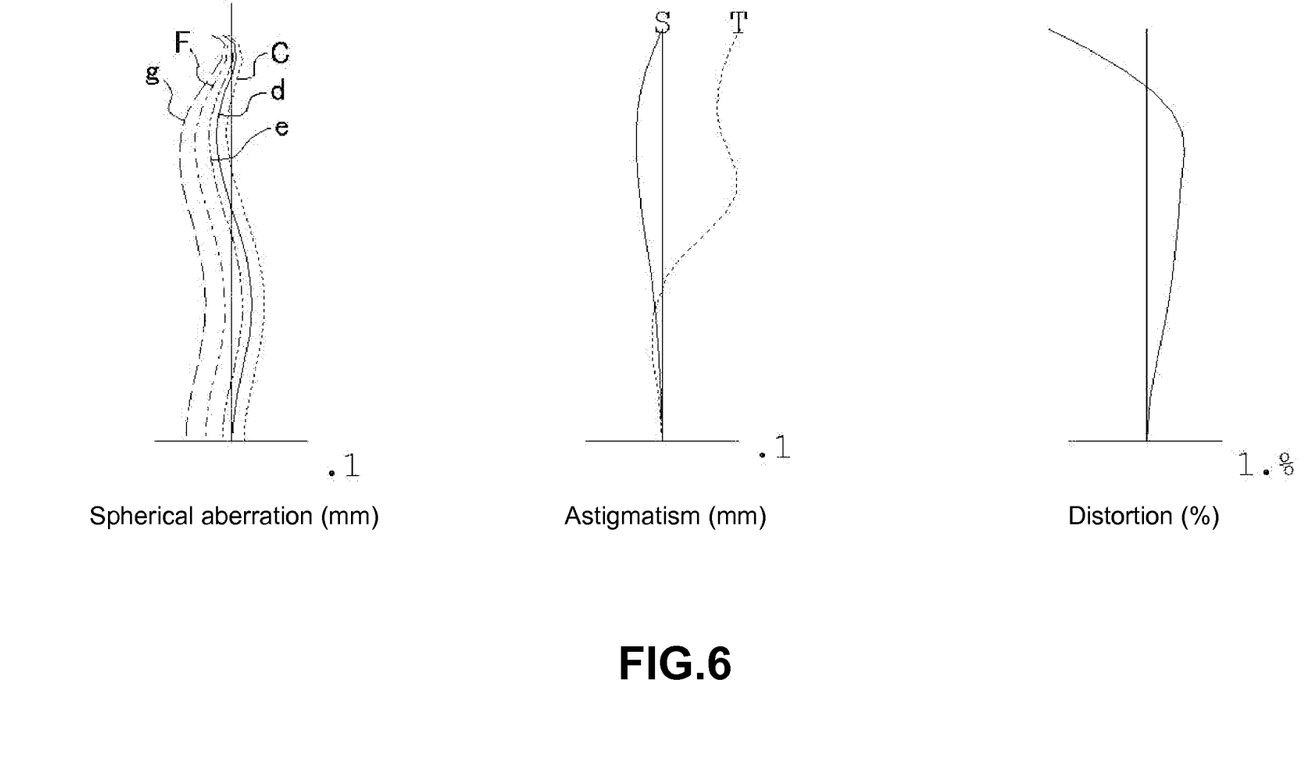
FIG. 6 is an aberration diagram showing a spherical aberration, an astigmatism, and a distortion of the imaging lens of FIG. 4.

FIG. 5 shows the lateral aberration that corresponds to the image height ratio H in the imaging lens of Numerical Data Example 2, and FIG. 6 shows a spherical aberration (mm), an astigmatism (mm), and a distortion (%), respectively. As shown in FIGS. 5 and 6, according to the imaging lens of Numerical Data Example 2, the aberrations are also satisfactorily corrected.

Numerical Data Example 3

Basic data are shown below.

f = 4.27 mm, Fno = 2.6, ω = 34.7°
Unit: mm

Surface Data

| Surface Number i | R | d | Nd | vd |
|---|---|---|---|---|
| (Object) | ∞ | ∞ | | |
| 1* | −1.841(=R1f) | 0.283 | 1.5351 | 56.1(=vd1) |
| 2* | −2.275(=R1r) | 0.030 | | |
| 3* (Stop) | 1.612(=R2f) | 0.731 | 1.5351 | 56.1(=vd2) |
| 4* | 12.456(=R2r) | 0.744 | | |
| 5* | −0.595 | 0.279 | 1.6142 | 26.0(=vd3) |
| 6* | −0.896 | 0.049 | | |
| 7* | 2.834 | 0.717 | 1.5351 | 56.1(=vd4) |
| 8* | −42.258 | 0.200 | | |
| 9 | ∞ | 0.300 | 1.5163 | 64.1 |
| 10 (Image plane) | ∞ | 2.500 | | | f1 = −23.34 mm
f2 = 3.38 mm
f3 = −4.46 mm
f4 = 4.99 mm
f12 = 3.73 mm
f23 = 8.25 mm
f34 = 65.18 mm

Aspheric Surface Data

First Surface $k = -6.028, A_4 = -1.368E-02, A_6 = 2.243E-04,$
$A_8 = 1.364E-03, A_{10} = -3.756E-04$
Second Surface $k = 0.000, A_4 = 5.574E-02, A_6 = -1.664E-02,$
$A_8 = 6.089E-03, A_{10} = -1.039E-03$
Third Surface $k = -3.517, A_4 = 4.452E-02, A_6 = 1.212E-02,$
$A_8 = -9.505E-04, A_{10} = -3.473E-02$ -continued f = 4.27 mm, Fno = 2.6, ω = 34.7°
Unit: mm Fourth Surface $k = 0.000, A_4 = -6.907E-02, A_6 = -7.243E-02,$
$A_8 = 7.723E-02, A_{10} = -5.968E-02$ Fifth Surface $k = -2.449, A_4 = -4.983E-01, A_6 = 6.631E-01,$
$A_8 = 6.554E-01, A_{10} = -1.613, A_{12} = 4.920E-01,$
$A_{14} = 6.196E-01, A_{16} = -3.522E-01$ Sixth Surface $k = -7.641E-01, A_4 = 6.518E-02, A_6 = 2.913E-01,$
$A_8 = 1.664E-01, A_{10} = -3.389E-01, A_{12} = 1.112E-01,$
$A_{14} = 3.184E-02, A_{16} = -1.815E-02$ Seventh Surface $k = -7.228E+01, A_4 = 1.382E-02, A_6 = 6.767E-03,$
$A_8 = -6.192E-03, A_{10} = 1.814E-03, A_{12} = 7.064E-05,$
$A_{14} = -1.193E-04, A_{16} = 1.486E-05$ Eighth Surface $k = 0.000, A_4 = -3.591E-02, A_6 = 2.460E-02,$
$A_8 = -8.341E-03, A_{10} = 7.940E-04, A_{12} = 2.388E-04,$
$A_{14} = -4.123E-05, A_{16} = -6.893E-07$ The values of the respective conditional expressions are as follows:

$$R1f/R1r=0.81$$

$$f1/f2=-6.90$$

$$R2f/R2r=0.13$$

$$f12/f34=0.057$$

$$f23/f=1.93$$

Accordingly, the imaging lens of Numerical Data Example 3 satisfies the above-described conditional expressions. A distance on the optical axis X from the object-side surface of the first lens L1 to the image plane IM (length in air) is 5.73 mm, and downsizing of the imaging lens is attained.

Figure 8:
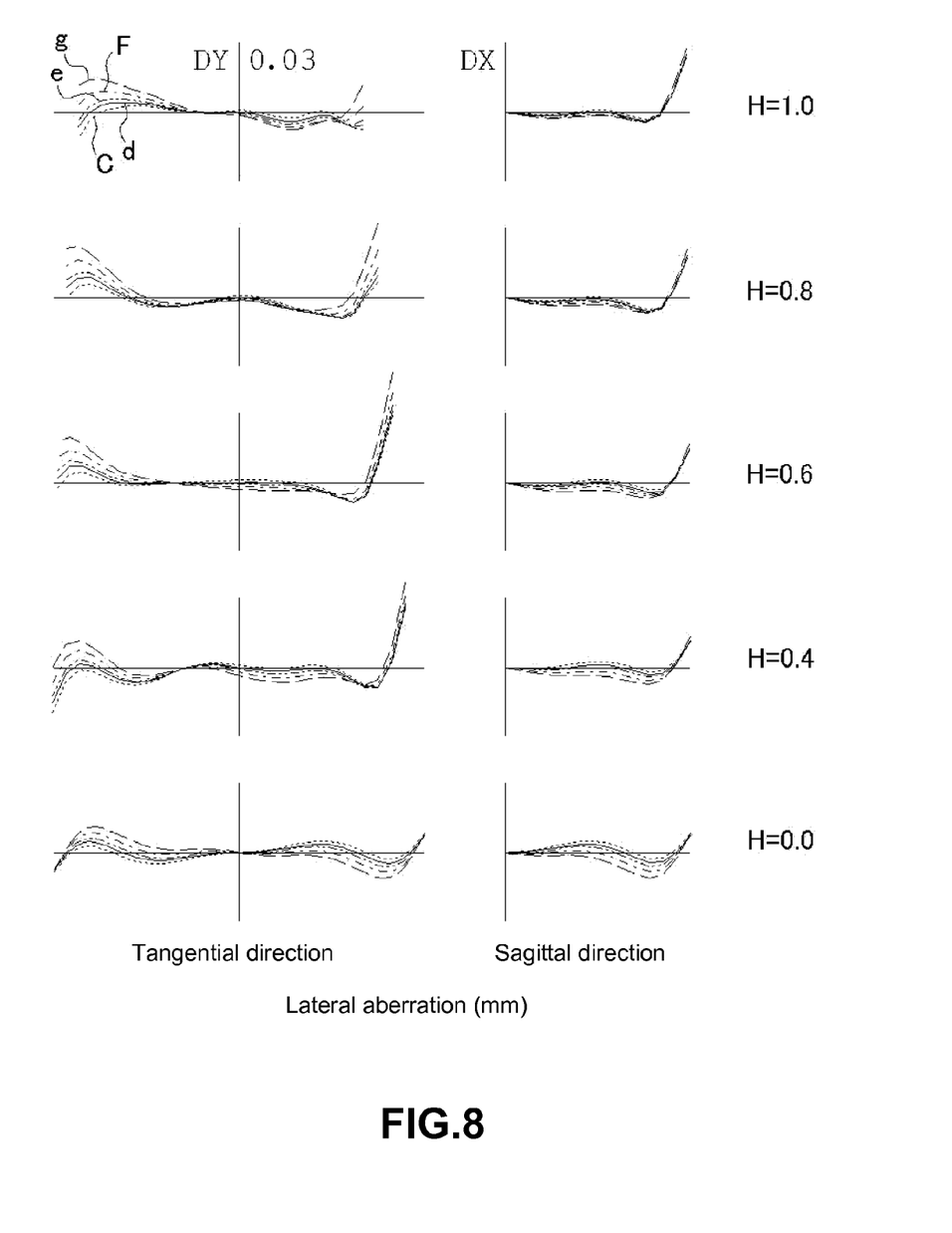
FIG. 8 is an aberration diagram showing a lateral aberration of the imaging lens of FIG. 7.
Figure 9:
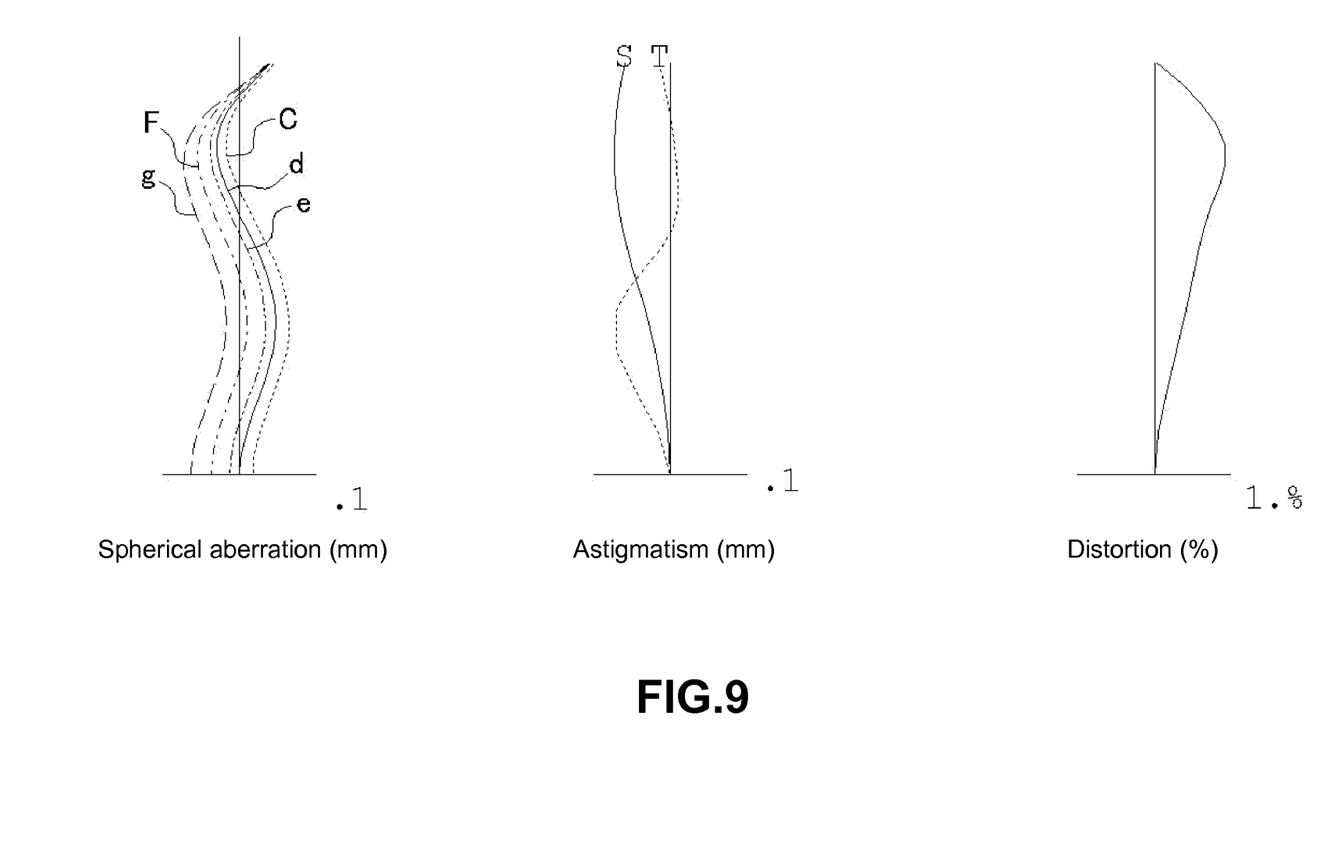
FIG. 9 is an aberration diagram showing a spherical aberration, an astigmatism, and a distortion of the imaging lens of FIG. 7.

FIG. 8 shows the lateral aberration that corresponds to the image height ratio H in the imaging lens of Numerical Data Example 3 and FIG. 9 shows a spherical aberration (mm), an astigmatism (mm), and a distortion (%), respectively, in the imaging lens. As shown in FIGS. 8 and 9, according to the imaging lens of Numerical Data Example 3, the aberrations are satisfactorily corrected.

In addition, the angle of view (2ω) of each imaging lens in Numerical Data Example 1 through 3 are 76.6°, 74.6°, and 69.4°, respectively, which are wider than that of a conventional imaging lens. Therefore, according to the imaging lens of the embodiment, it is achievable to take an image in wider range than a conventional imaging lens.

Accordingly, when the imaging lens of the embodiment is applied in an imaging optical system, such as a camera mounted in portable devices including cellular phones, portable information terminals, and smart phones, digital still cameras, security cameras, vehicle onboard cameras, and network cameras, it is possible to attain both high functions and a small size of the cameras.

The invention can be applied in devices that require an imaging lens for mounting therein to attain downsizing and wide angle as in cellular phones and smart phones.

The disclosure of Japanese Patent Application No. 2012-095204, filed on Apr. 19, 2012, is incorporated in the application by reference.

While the invention has been explained with reference to the specific embodiments of the invention, the explanation is illustrative and the invention is limited only by the appended claims.

What is claimed is:

1. An imaging lens comprising:
a first lens having negative refractive power;
a stop;
a second lens having positive refractive power;
a third lens having negative refractive power; and
a fourth lens having positive refractive power arranged in this order from an object side to an image plane side,
wherein said first lens is formed in a shape so that a surface thereof on the object side is concave and a surface thereof on the image plane side is convex,
said second lens is formed in a shape so that a surface thereof on the object side is convex and a surface thereof on the image plane side is concave,
said third lens is formed in a shape so that a surface thereof on the object side is concave and a surface thereof on the image plane side is convex,
said fourth lens is formed in a shape so that a surface thereof on the object side is convex, and
said first lens has a focal length f1 and said second lens has a focal length f2 so that the following conditional expression is satisfied:

$$-8.0<f1/f2<-4.0.$$

2. An imaging lens comprising:
a first lens having negative refractive power;
a stop;
a second lens having positive refractive power;
a third lens having negative refractive power; and
a fourth lens having positive refractive power arranged in this order from an object side to an image plane side,
wherein said first lens is formed in a shape so that a surface thereof on the object side is concave and a surface thereof on the image plane side is convex,
said second lens is formed in a shape so that a surface thereof on the object side is convex and a surface thereof on the image plane side is concave,
said third lens is formed in a shape so that a surface thereof on the object side is concave and a surface thereof on the image plane side is convex,
said fourth lens is formed in a shape so that a surface thereof on the object side is convex, and
said second lens has the surface on the object side having a curvature radius R2f and the surface on the image plane side having a curvature radius R2r so that the following conditional expression is satisfied:

$$0.05<R2f/R2r<0.15.$$

3. An imaging lens comprising:
a first lens having negative refractive power;
a stop;
a second lens having positive refractive power;
a third lens having negative refractive power; and
a fourth lens having positive refractive power arranged in this order from an object side to an image plane side,
wherein said first lens is formed in a shape so that a surface thereof on the object side is concave and a surface thereof on the image plane side is convex, said second lens is formed in a shape so that a surface thereof on the object side is convex and a surface thereof on the image plane side is concave, said third lens is formed in a shape so that a Surface thereof on the object side is concave and a surface thereof on the image plane side is convex, said fourth lens is formed in a shape so that a surface thereof on the object side is convex, and said first lens and said second lens have a composite focal length f12, and said third lens and said fourth lens have a composite focal length f34 so that the following conditional expression is satisfied:

$0.05 < f12/f34 < 0.20$.

4. An imaging lens comprising:
a first lens having negative refractive power;
a stop;
a second lens having positive refractive power;
a third lens having negative refractive power; and
a fourth lens having positive refractive power arranged in this order from an object side to an image plane side, wherein said first lens is formed in a shape so that a surface thereof on the object side is concave and a surface thereof on the image plane side is convex, said second lens is formed in a shape so that a surface thereof on the object side is convex and a surface thereof on the image plane side is concave, said third lens is formed in a shape so that a surface thereof on the object side is concave and a surface thereof on the image plane side is convex, said fourth lens is formed in a shape so that a surface thereof on the image plane side is convex, and said first lens has a focal length f1 and said second lens has a focal length f2 so that the following conditional expression is satisfied:

$-8.0 < f1/f2 < -4.0$.

5. The imaging lens according to claim 1, wherein said first lens has the surface on the object side having a curvature radius R1f and the surface on the image plane side having a curvature radius R1r so that the following conditional expression is satisfied:

$0.5 < R1f/R1r < 0.95$.

6. The imaging lens according to claim 1, wherein said second lens has the surface on the object side having a curvature radius R2f and the surface on the image plane side having a curvature radius R2r so that the following conditional expression is satisfied:

$0.05 < R2f/R2r < 0.15$.

7. The imaging lens according to claim 1, wherein said first lens and said second lens have a composite focal length f12, and said third lens and said fourth lens have a composite focal length f34 so that the following conditional expression is satisfied:

$0.05 < f12/f34 < 0.20$.

8. The imaging lens according to claim 1, wherein said second lens and said third lens have a composite focal length f23 and f is a focal length of a whole lens system so that the following conditional expression is satisfied:

$1.5 < f23/f < 2.5$.

9. The imaging lens according to claim 1, wherein said first lens has an Abbe's number vd1, said second lens has an Abbe's number vd2, said third lens has an Abbe's number vd3, and said fourth lens has an Abbe's number vd4 so that the following conditional expressions are satisfied:

$45 < vd1, vd2, vd4 < 75$ $20 < vd3 < 40$.

10. The imaging lens according to claim 2, wherein said first lens has the surface on the object side having a curvature radius R1f and the surface on the image plane side having a curvature radius R1r so that the following conditional expression is satisfied:

$0.5 < R1f/R1r < 0.95$.

11. The imaging lens according to claim 2, wherein said first lens has a focal length f1 and said second lens has a focal length f2 so that the following conditional expression is satisfied:

$-8.0 < f1/f2 < -4.0$.

12. The imaging lens according to claim 2, wherein said first lens and said second lens have a composite focal length f12, and said third lens and said fourth lens have a composite focal length f34 so that the following conditional expression is satisfied:

$0.05 < f12/f34 < 0.20$.

13. The imaging lens according to claim 12, wherein said second lens and said third lens have a composite focal length f23 and f is a focal length of a whole lens system so that the following conditional expression is satisfied:

$1.5 < f23/f < 2.5$.

14. The imaging lens according to claim 2, wherein said first lens has an Abbe's number vd1, said second lens has an Abbe's number vd2, said third lens has an Abbe's number vd3, and said fourth lens has an Abbe's number vd4 so that the following conditional expressions are satisfied:

$45 < vd1, vd2, vd4 < 75$ $20 < vd3 < 40$.

15. The imaging lens according to claim 3, wherein said first lens has the surface on the object side having a curvature radius R1f and the surface on the image plane side having a curvature radius R1r so that the following conditional expression is satisfied:

$0.5 < R1f/R1r < 0.95$.

16. The imaging lens according to claim 3, wherein said first lens has a focal length f1 and said second lens has a focal length f2 so that the following conditional expression is satisfied:

$-8.0 < f1/f2 < -4.0$.

17. The imaging lens according to claim 3, wherein said second lens has the surface on the object side having a curvature radius R2f and the surface on the image plane side having a curvature radius R2r so that the following conditional expression is satisfied:

$0.05 < R2f/R2r < 0.15$.

18. The imaging lens according to claim 3, wherein said second lens and said third lens have a composite focal length f23 and f is a focal length of a whole lens system so that the following conditional expression is satisfied:

$1.5 < f23/f < 2.5$.

19. The imaging lens according to claim 3, wherein said first lens has an Abbe's number vd1, said second lens has an Abbe's number vd2, said third lens has an Abbe's number vd3, and said fourth lens has an Abbe's number vd4 so that the following conditional expressions are satisfied:

$$45 < vd1, vd2, vd4 < 75$$

$$20 < vd3 < 40.$$

20. The imaging lens according to claim 4, wherein said first lens has the surface on the object side having a curvature radius R1f and the surface on the image plane side having a curvature radius R1r so that the following conditional expression is satisfied:

$$0.5 < R1f/R1r < 0.95.$$

21. The imaging lens according to claim 4, wherein said second lens has the surface on the object side having a curvature radius R2f and the surface on the image plane side having a curvature radius R2r so that the following conditional expression is satisfied:

$$0.05 < R2f/R2r < 0.15.$$

22. The imaging lens according to claim 4, said first lens and said second lens have a composite focal length f12, and said third lens and said fourth lens have a composite focal length f34 so that the following conditional expression is satisfied:

$$0.05 < f12/f34 < 0.20.$$

23. The imaging lens according to claim 4, wherein said second lens and said third lens have a composite focal length f23 and f is a focal length of a whole lens system so that the following conditional expression is satisfied:

$$1.5 < f23/f < 2.5.$$

24. The imaging lens according to claim 4, wherein said first lens has an Abbe's number vd1, said second lens has an Abbe's number vd2, said third lens has an Abbe's number vd3, and said fourth lens has an Abbe's number vd4 so that the following conditional expressions are satisfied:

$$45 < vd1, vd2, vd4 < 75$$

$$20 < vd3 < 40.$$

* * * * *